US012425286B2

United States Patent
Liu et al.

(10) Patent No.: US 12,425,286 B2
(45) Date of Patent: Sep. 23, 2025

(54) SIGNAL MODULATING METHOD, SIGNAL DEMODULATING METHOD, DEVICE, STORAGE MEDIUM AND PROGRAM PRODUCT

(71) Applicant: HUAWEI TECHNOLOGIES CO., LTD., Guangdong (CN)

(72) Inventors: Chenchen Liu, Shenzhen (CN); Ming Gan, Shenzhen (CN); Yuxin Lu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 70 days.

(21) Appl. No.: 18/481,311

(22) Filed: Oct. 5, 2023

(65) Prior Publication Data
US 2024/0031212 A1   Jan. 25, 2024

Related U.S. Application Data

(63) Continuation of application No. PCT/CN2022/085378, filed on Apr. 6, 2022.

(30) Foreign Application Priority Data

Apr. 6, 2021   (CN) .......................... 202110369353.9

(51) Int. Cl.
*H04L 27/26* (2006.01)
*H04L 5/00* (2006.01)

(52) U.S. Cl.
CPC ........ *H04L 27/2627* (2013.01); *H04L 5/0048* (2013.01); *H04L 27/2614* (2013.01)

(58) Field of Classification Search
CPC ............... H04L 27/2627; H04L 5/0048; H04L 27/2614; H04L 27/2602; H04L 27/2621;
(Continued)

(56) References Cited

U.S. PATENT DOCUMENTS 10,097,393 B1   10/2018   Huang et al.
2016/0352552 A1*  12/2016   Liu ........................ H04L 5/0092
(Continued)

FOREIGN PATENT DOCUMENTS

CN   102656855 A    9/2012
WO   2013152111 A1  10/2013

OTHER PUBLICATIONS

Chenchen Liu et al: "Discussions on PAPR Reduction Methods for DUP Mode." IEEE 802.11-20/1206r0. Aug. 7, 2020, total 14 pages.
(Continued)

*Primary Examiner* — Khanh C Tran

(57) ABSTRACT

The technology of this disclosure relates to a signal modulating method, a signal demodulating method, a device, a storage medium, and a program product. In the signal modulating method according to a first aspect of this disclosure, a sending device modulates a bit sequence onto a plurality of subcarriers through binary phase shift keying (BPSK) constellation point mapping, dual carrier modulation (DCM), and a duplication (DUP) operation, where the plurality of subcarriers include a first group of subcarriers and a second group of subcarriers. Then, the sending device changes a phase of first data carried in the first group of subcarriers by 90 degrees or minus 90 degrees, and further generates a modulation signal based on the first data that is carried in the first group of subcarriers and whose phase has been changed and second data carried in the second group of subcarriers.

19 Claims, 9 Drawing Sheets

(58) Field of Classification Search
CPC ... H04L 27/2601; H04L 1/0041; H04L 27/28; H04B 7/12
See application file for complete search history.

(56) References Cited

U.S. PATENT DOCUMENTS

| | | | |
|---|---|---|---|
| 2017/0104553 A1* | 4/2017 | Liu | H04L 27/2626 |
| 2017/0180177 A1* | 6/2017 | Wu | H04L 27/2637 |
| 2018/0309550 A1* | 10/2018 | Sun | H04L 27/2613 |
| 2021/0391961 A1 | 12/2021 | Cao et al. | |
| 2023/0283421 A1* | 9/2023 | Lim | H04L 1/0009 370/338 |
| 2024/0154844 A1* | 5/2024 | Dogukan | H04L 27/2634 |

OTHER PUBLICATIONS

Eunsung Park et al: "PAPR issues for EHT ER SU PPDU." IEEE 802.11-20/1135r1. Jul. 27, 2020, total 10 pages.

Office Action for Chinese Application No. 202110369353 dated Nov. 6, 2023, 7 pages.

Claudio Da Silva (Intel): "Performance Requirements for the EDMG SC Mode", IEEE Draft; 11-18-0713-01-00AY-PERFORMANCE-REQUIREMENTS-FOR-THE-EDMG-SC-MODE, IEEE-SA Mentor, Piscataway, NJ USA, vol. 802.11ay, No. 1 May 7, 2018 (May 7, 2018), pp. 1-6, XP068125806.

Yung-Szu Tu(Ralink Tech): "Proposal for TGac VHT Format", IEEE Draft; 11-09-1258-00-00AC-PROPOSAL-FOR-TGAC-VHT-FORMAT, IEEE-SA Mentor, Piscataway, NJ USA, vol. 802.11ac, Nov. 19, 2009 (Nov. 19, 2009), pp. 1-12, XP017677990.

Extended European Search Report for EP Application No. 22784066.7 dated Jul. 22, 2024, 12 pages.

IEEE Computer Society: IEEE P802.11be™/D0.1Draft Standard for Information technology-Telecommunications and information exchange between systems Local and metropolitan area networks-Specific requirements, Sep. 2020, total 299 pages.

Eunsung Park et al: "PAPR issues for EHT ER SU PPDU", IEEE 802.11-20/1135r0,LG Electronics, Jul. 27, 2020, total 10 pages.

IEEE P802.11ax™M/D6.0, Part 11: Wireless LAN Medium Access Control(MAC) and Physical Layer (PHY) Specifications,Amendment 1: Enhancements for High Efficiency WLAN, Nov. 2019, total 780 pages.

Chenchen Liu et al: "Discussions on PAPR Reduction Methods for DUP Mode", IEEE 802.11-20/1206r1, Huawei Technologies Co., Ltd, Aug. 7, 2020, total 14 pages.

IEEE Std 802.11™—2016(Revision of IEEE Std 802.11-2012), Part 11: Wireless LAN Medium Access Control (MAC) and Physical Layer (PHY) Specifications, IEEE Computer Society, Sponsored by the LAN/MAN Standards Committee, total 3534 pages.

PCT International Search Report for Application No. PCT/CN2022/085378 dated Apr. 6, 2022, 12 pages.

European Search Report for EP Application No. 22784066 dated Jul. 22, 2024, 12 pages.

\* cited by examiner

SIGNAL MODULATING METHOD, SIGNAL DEMODULATING METHOD, DEVICE, STORAGE MEDIUM AND PROGRAM PRODUCT

CROSS-REFERENCE TO RELATED APPLICATIONS

This application is a continuation of International Application No. PCT/CN2022/085378, filed on Apr. 6, 2022, which claims priority to Chinese Patent Application No. 202110369353.9, filed on Apr. 6, 2021. The disclosures of the aforementioned applications are hereby incorporated by reference in their entireties.

TECHNICAL FIELD

Embodiments of this disclosure relate to, among other aspects, the field of information communication, and more specifically, to a signal modulating method, a signal demodulating method, a device, a storage medium and a program product.

BACKGROUND

An orthogonal frequency division multiplexing (OFDM) technology is a multi-carrier modulation technology that has advantages of high spectral efficiency, anti-multipath fading, and the like, but also has a disadvantage of a large peak-to-average power ratio (PAPR). Accumulation of a plurality of subcarriers in the OFDM generates a large peak signal. Therefore, a high power amplifier is required to have a large linear dynamic range. This increases costs of the high power amplifier and also reduces efficiency of the high power amplifier. If a peak value exceeds the linear dynamic range of the high power amplifier, in-band distortion and out-of-band dispersion are caused. Therefore, reducing the PAPR is a key technology of an OFDM system, and is of great significance. In the IEEE 802.11be standard, a technology combination of a duplication mode (DUP mode) and dual carrier modulation (DCM) is used for resolving a high PAPR problem caused by a frequency domain duplication.

SUMMARY

Embodiments of this disclosure provide a signal modulating and demodulating solution.

According to a first aspect of this disclosure, a signal modulating method is provided. The method includes: modulating a bit sequence onto a plurality of subcarriers through binary phase shift keying BPSK constellation point mapping, dual carrier modulation DCM, and a duplication DUP operation, where the plurality of subcarriers include a first group of subcarriers and a second group of subcarriers; changing a phase of first data carried in the first group of subcarriers by a predetermined angle, where the predetermined angle is 90 degrees or minus 90 degrees; and generating a modulation signal based on the first data that is carried in the first group of subcarriers and whose phase has been changed and the second data carried in the second group of subcarriers.

By changing the phase of the first data carried in the first group of subcarriers, in this embodiment of this disclosure, the data carried in the subcarriers can include both a real value and an imaginary value. Therefore, both an I channel and a Q channel are used when a signal is sent, to enhance a diversity gain of a system.

In some embodiments of the first aspect, the first group of subcarriers includes a plurality of odd-numbered subcarriers in the subcarriers, and the second group of subcarriers includes a plurality of even-numbered subcarriers in the subcarriers.

In some embodiments of the first aspect, the first group of subcarriers includes the plurality of even-numbered subcarriers in the subcarriers, and the second group of subcarriers includes the plurality of odd-numbered subcarriers in the subcarriers.

By changing the phase of data carried in subcarriers at an odd-numbered location or an even-numbered location in the plurality of groups of subcarriers, the I channel and the Q channel can be used more evenly.

According to a second aspect of this disclosure, a signal demodulating method is provided. The method includes: obtaining first data carried in a first group of subcarriers and second data carried in a second group of subcarriers in a plurality of subcarriers; changing a phase of the first data by a predetermined angle, where the predetermined angle is 90 degrees or minus 90 degrees; and determining, based on the first data whose phase has been changed and the second data, a bit sequence.

Based on this manner, in this embodiment of this disclosure, the bit sequence can be effectively obtained by demodulating from a received modulation signal.

In some embodiments of the second aspect, the first group of subcarriers includes a plurality of odd-numbered subcarriers in the subcarriers, and the second group of subcarriers includes a plurality of even-numbered subcarriers in the subcarriers.

In some embodiments of the second aspect, the first group of subcarriers includes the plurality of even-numbered subcarriers in the subcarriers, and the second group of subcarriers includes the plurality of odd-numbered subcarriers in the subcarriers.

According to a third aspect of this disclosure, a signal modulating method is provided. The method includes: determining, through quadrature phase shift keying (QPSK) constellation point mapping, at least one first frequency domain sequence corresponding to a bit sequence; determining, based on a complex number transformation of the at least one first frequency domain sequence, at least one second frequency domain sequence; determining, based on the at least one first frequency domain sequence and the at least one second frequency domain sequence through at least one of dual carrier modulation DCM and a duplication DUP operation, data carried in the plurality of subcarriers; and generating a modulation signal based on the data carried in the plurality of subcarriers.

Based on this manner, in this embodiment of this disclosure, resource utilization efficiency can be provided, and a diversity gain of a system can be provided.

In some embodiments of the third aspect, the complex number transformation includes at least one of the following: a conjugate transformation; swapping between an imaginary part and a real part; or a negation operation.

In some embodiments of the third aspect, at least one duplication process includes a first duplication process, where the first duplication process enables a value at an odd-numbered location or an even-numbered location in a to-be-duplicated frequency domain sequence to be negated, to generate a duplicated frequency domain sequence.

In some embodiments of the third aspect, the at least one duplication process includes a second duplication process, where the second duplication process enables a value of a first half or a second half in the to-be-duplicated frequency domain sequence to be negated, to generate a duplicated frequency domain sequence.

According to a fourth aspect of this disclosure, a signal demodulating method is provided. The method includes: obtaining data carried in a plurality of groups of subcarriers, where the plurality of groups of subcarriers include at least four groups of subcarriers used for carrying same information; and determining, based on the data carried in at least one group of subcarriers in the plurality of groups of subcarriers, a bit sequence through quadrature phase shift keying QPSK constellation point demapping.

In some embodiments of the fourth aspect, the plurality of groups of subcarriers include eight groups of subcarriers.

Based on this manner, in this embodiment of this disclosure, a bit sequence can be effectively obtained by demodulating from a received modulation signal.

In some embodiments of the fourth aspect, the determining a bit sequence corresponding to the received signal through quadrature phase shift keying QPSK constellation point demapping includes: performing a complex number transformation on data carried in at least one group of subcarriers; determining, by performing QPSK constellation point demapping on data on which complex number transformation has been performed, an intermediate sequence corresponding to the data on which the complex number transformation has been performed; and determining, based on at least the intermediate sequence, the bit sequence.

In some embodiments of the fourth aspect, a complex number inverse transformation includes at least one of the following: a conjugate transformation; swapping between an imaginary part and a real part; or a negation operation.

According to a fifth aspect of this disclosure, a sending device is provided. The sending device includes: a carrier modulation module, configured to modulate a bit sequence onto a plurality of subcarriers through binary phase shift keying BPSK constellation point mapping, dual carrier modulation DCM, and duplication DUP operation, where the plurality of subcarriers include a first group of subcarriers and a second group of subcarriers; a phase adjustment module, configured to change a phase of first data carried in the first group of subcarriers by a predetermined angle, where the predetermined angle is 90 degrees or minus 90 degrees; and a first signal generation module, configured to generate a modulation signal based on first data that is carried in a first group of subcarriers and whose phase has been changed and second data carried in a second group of subcarriers.

In some embodiments of the fifth aspect, the first group of subcarriers includes a plurality of odd-numbered subcarriers in the subcarriers, and the second group of subcarriers includes a plurality of even-numbered subcarriers in the subcarriers.

In some embodiments of the fifth aspect, the first group of subcarriers includes the plurality of even-numbered subcarriers in the subcarriers, and the second group of subcarriers includes the plurality of odd-numbered subcarriers in the subcarriers.

According to a sixth aspect of this disclosure, a receiving device is provided. The receiving device includes: a first data obtaining module, configured to determine first data carried in a first group of subcarriers in a plurality of subcarriers and second data carried in a second group of subcarriers; a phase inverse adjustment module, configured to change a phase of the first data by a predetermined angle, where the predetermined angle is 90 degrees or minus 90 degrees; and a first sequence determining module, configured to determine a bit sequence based on the first data whose phase has been changed and the second data.

In some embodiments of the sixth aspect, the first group of subcarriers includes a plurality of odd-numbered subcarriers in the subcarriers, and the second group of subcarriers includes a plurality of even-numbered subcarriers in the subcarriers.

In some embodiments of the sixth aspect, the first group of subcarriers includes the plurality of even-numbered subcarriers in the subcarriers, and the second group of subcarriers includes the plurality of odd-numbered subcarriers in the subcarriers.

According to a seventh aspect of this disclosure, a sending device is provided. The sending device includes: a QPSK mapping module, configured to determine, through quadrature phase shift keying QPSK constellation point mapping, at least one first frequency domain sequence corresponding to a bit sequence; a transformation module, configured to determine at least one second frequency domain sequence based on a complex number transformation on the at least one first frequency domain sequence; a duplication module, configured to determine, based on at least one first frequency domain sequence and at least one second frequency domain sequence through at least one of dual carrier modulation DCM and a duplication DUP operation, data carried in a plurality of subcarriers; and a second signal generation module, configured to generate a modulation signal based on the data carried in the plurality of subcarriers.

In some embodiments of the seventh aspect, the complex number transformation includes at least one of the following: a conjugate transformation; swapping between an imaginary part and a real part; or a negation operation.

In some embodiments of the seventh aspect, at least one duplication process includes a first duplication process, where the first duplication process enables a value at an odd-numbered location or an even-numbered location in a to-be-duplicated frequency domain sequence to be negated, to generate a duplicated frequency domain sequence.

In some embodiments of the seventh aspect, the at least one duplication process includes a second duplication process, where the second duplication process enables a value of a first half or a second half in the to-be-duplicated frequency domain sequence to be negated, to generate a duplicated frequency domain sequence.

According to an eighth aspect of this disclosure, a receiving device is provided. The receiving device includes: a second data obtaining module, configured to obtain data carried in a plurality of groups of subcarriers, where the plurality of groups of subcarriers include at least four groups of subcarriers used for carrying same information; and a second sequence determining module, configured to determine, based on data carried in at least one group of the plurality of groups of subcarriers, a bit sequence through quadrature phase shift keying QPSK constellation point demapping.

In some embodiments of the eighth aspect, the plurality of groups of subcarriers include eight groups of subcarriers.

In some embodiments of the eighth aspect, the second sequence determining module is further configured to: perform a complex number transformation on data carried in at least one group of subcarriers; determine, by performing the QPSK constellation point demapping on data on which the complex number transformation has been performed, an intermediate sequence corresponding to the data on which the complex number transformation has been performed; and determine, based on at least the intermediate sequence, a bit sequence.

In some embodiments of the eighth aspect, a complex number inverse transformation includes at least one of the following: a conjugate transformation; swapping between an imaginary part and a real part; or a negation operation.

According to a ninth aspect of this disclosure, a sending device, a processor, and a memory are provided. The memory is configured to store instructions performed by a processor, and when the instructions are performed by the processor, the processor is enabled to perform the method according to a first aspect or a third aspect.

According to a tenth aspect of this disclosure, a receiving device is provided. The receiving device includes: a processor and a memory. The memory is configured to store instructions performed by a processor, and when the instructions are performed by the processor, the processor is enabled to perform the method according to a second aspect or a fourth aspect.

According to an eleventh aspect of this disclosure, a computer-readable storage medium is provided. The computer-readable storage medium stores a computer program, and when the program is performed by a processor, the method according to the first aspect, the second aspect, the third aspect, or the fourth aspect is implemented.

According to a twelfth aspect of this disclosure, a computer program product is provided, where the computer program product includes computer-executable instructions, and when the computer-executable instructions are performed by a processor, the method according to the first aspect, the second aspect, the third aspect, or the fourth aspect is implemented.

The technology content part is provided to describe a selection of concepts in a simplified form, which will be further described in the following descriptions of embodiments. The technology content part is not intended to identify a key feature or an essential feature of this disclosure or to limit a scope of this disclosure.

BRIEF DESCRIPTION OF DRAWINGS

The foregoing and other features, advantages, and aspects of embodiments of this disclosure will become more evident with reference to the accompanying drawings and the following detailed descriptions. In the accompanying drawings, same or similar reference numerals represent same or similar elements, where.

DESCRIPTION OF EMBODIMENTS

The following describes embodiments of this disclosure in more detail with reference to accompanying drawings. Although some embodiments of this disclosure are shown in the accompanying drawings, it should be understood that this disclosure may be implemented in various forms and should not be construed as being limited to the embodiments described herein. On the contrary, these embodiments are provided for a more thorough and complete understanding of this disclosure. It should be understood that the accompanying drawings and embodiments of this disclosure are merely used as an example, but are not intended to limit the protection scope of this disclosure.

In the descriptions of embodiments of this disclosure, the term "include" and similar terms thereof should be understood as an open inclusion, that is, "include but not limited to". The term "based on" should be understood as "at least partially based on". The term "an embodiment" or "the embodiment" should be understood as "at least one embodiment". The terms "first", "second", and the like may refer to different or same objects. Other explicit and implicit definitions may also be included below.

Example Communication Environment

Figure 1:
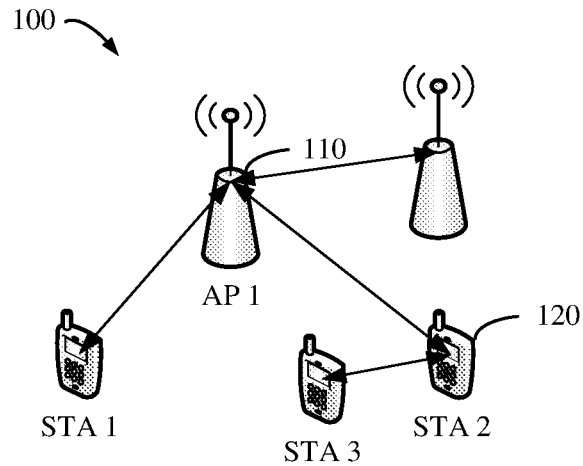
FIG. 1 is an example schematic block diagram of a communication environment in which embodiments of this disclosure may be implemented.

IEEE 802.11 is one of mainstream wireless access standards and has been widely used in commercial application. FIG. 1 is a schematic diagram of a communication environment 100 in which embodiments of this disclosure may be implemented. As shown in FIG. 1, the communication environment 100 may include one or more access points APs 110 and one or more stations STAs 120.

In the communication environment 100, the access point AP 110 may access the Internet in a wired or wireless manner, and may be associated with one or more stations STAs 120. Data communication may be performed between the access point AP 110 and the associated station STA 120, between different access points 110, and between different stations STAs 120 according to a predetermined protocol (for example, the IEEE 802.11 protocol). In some embodiments, the access point AP 100 may be, for example, a wireless router. The station STA 120 may include a wireless mobile device, and an example of the wireless mobile device includes but is not limited to a smartphone, a laptop computer, a tablet computer, an intelligent wearable device, an in-vehicle mobile device, or the like.

In a process of communication between different devices, to-be-transmitted data may be modulated into a modulation signal by a sending device, and sent to a corresponding receiving device. The IEEE 802.11ax standard introduces dual carrier modulation (DCM) to modulate same information on a pair of subcarriers, to improve an anti-interference capability. The DCM dual carrier modulation enables one signal to be repeatedly transmitted on two subcarriers at the same time to improve diversity effect.

In the IEEE 802.11be standard, a 6 GHz spectrum is also open for use. However, current regulations impose a strict power density limit on a device that works indoors in a 6G frequency band, and consequently, a transmission distance of an indoor Wi-Fi device is greatly limited. To increase an indoor transmission distance, the IEEE 802.11be standard uses a technology combination of a duplication mode (DUP mode) and the DCM.

For example, for a DUP mode in an 80 MHz bandwidth, same information is transmitted in a low 40 MHz bandwidth (corresponding to 484 resource units RUs) and a high 40 MHz bandwidth (484 RUs). For a DUP mode in a 160 MHz bandwidth, same content is transmitted in a low 80 MHz bandwidth (996 RUs) and a high 80 MHz bandwidth (996 RUs). For a DUP mode in a 320 MHz bandwidth, same content is transmitted in low 160 MHz (2*996 RUs) and high 160 MHz (2*996 RUs). According to the IEEE 802.11be standard, the DUP mode is used only when both the DCM and a binary phase shift keying (BPSK) mode are enabled.

Figure 2:
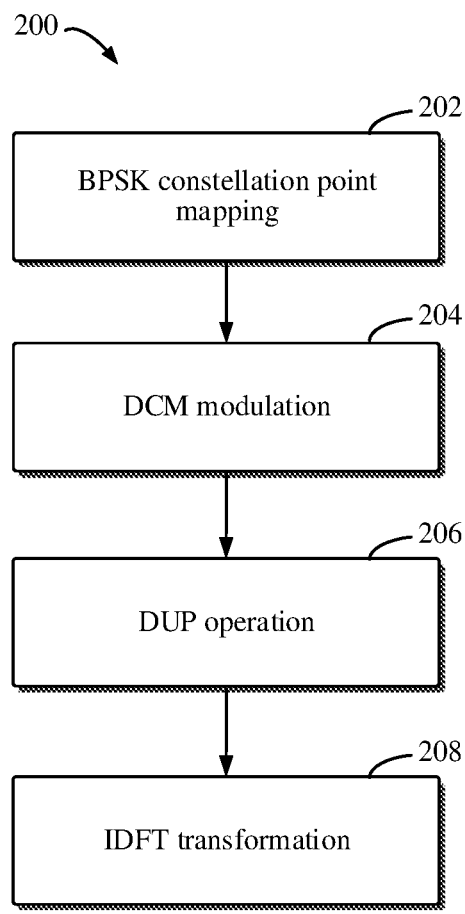
FIG. 2 is an example schematic diagram of a conventional example process of modulating a signal.

FIG. 2 is a schematic diagram of a conventional example process 200 of modulating a signal. As shown in FIG. 2, according to the conventional IEEE 802.11be standard, in a DUP mode, first, in step 202, to-be-modulated data may be converted into a corresponding frequency domain sequence through BPSK constellation point mapping. Then, the frequency domain sequence may be mapped to a corresponding group of subcarriers, to determine data carried in the group of subcarriers.

In step 204, data carried in another group of subcarriers is determined based on a DCM modulation. For example, another frequency domain sequence may be determined based on an original frequency domain sequence, where a correspondence between an element in the another frequency domain sequence and an element in the original frequency domain sequence may be represented as follows:

$$d'_{k+N_{sd}} = d_k \times (-1)^k \quad (1)$$

$d_k$ represents a $k^{th}$ element in the original frequency domain sequence determined through BPSK mapping, $d'_{k+N_{sd}}$ represents a $k^{th}$ element in another frequency domain sequence, and $N_{sd}$ represents a quantity of data subcarriers included in a resource block. For example, in a 160 MHz bandwidth mode, $N_{sd}$ is 490, in other words, data carried in a second group of 490 data subcarriers is determined by negating data carried in a data subcarrier at an even-numbered location in a first group of data subcarriers.

In step 206, data carried in a data subcarrier included in another resource block is determined based on a DUP duplication operation. Specifically, the process may be expressed as follows:

$$\tilde{d}_{k,2} = \begin{cases} -d_{k,1}, & \text{if } 0 \le k < N_{sd} \\ d_{k,1}, & \text{if } N_{sd} \le k < 2*N_{sd} \end{cases} \quad (2)$$

$d_{k,1}$ represents data carried in a $k^{th}$ data subcarrier in a first resource block, and $\tilde{d}_{k,2}$ represents data carried in a $k^{th}$ data subcarrier in a second resource block. For example, in a 160 MHz bandwidth mode, data carried in a third group of 490 data subcarriers is determined by negating data carried in a first group of 490 data subcarriers, and data carried in a fourth group of 490 data subcarriers is directly copied from data carried in a second group of 490 data subcarriers.

In step 208, frequency domain data may be converted into the time domain data based on inverse discrete Fourier transform (IDFT), to generate a modulation signal.

However, in a conventional signal modulation process, the BPSK constellation point mapping always converts one bit in to-be-modulated data into 1 or −1. Such data will have only a real part, which results in that only one of an I channel or a Q channel can be used when the modulation signal is transmitted, and therefore a diversity gain cannot be fully used.

First Implementation of this Disclosure

According to an example embodiment of this disclosure, an improved signal modulating and demodulating solution is provided. Specifically, in a signal modulating process, a sending device modulates a bit sequence onto a plurality of subcarriers through binary phase shift keying BPSK constellation point mapping, dual carrier modulation DCM, and a duplication DUP operation, where the plurality of subcarriers include a first group of subcarriers and a second group of subcarriers. Then, the sending device changes a phase of first data carried in a first group of subcarriers by 90 degrees or minus 90 degrees, and further generates the modulation signal based on the first data that is carried in the first group of subcarriers and whose phase has been changed and the second data carried in the second group of subcarriers. Based on this manner, the I channel and the Q channel can be simultaneously used when the modulation signal is sent, to enhance a diversity gain of a system.

Figure 3:
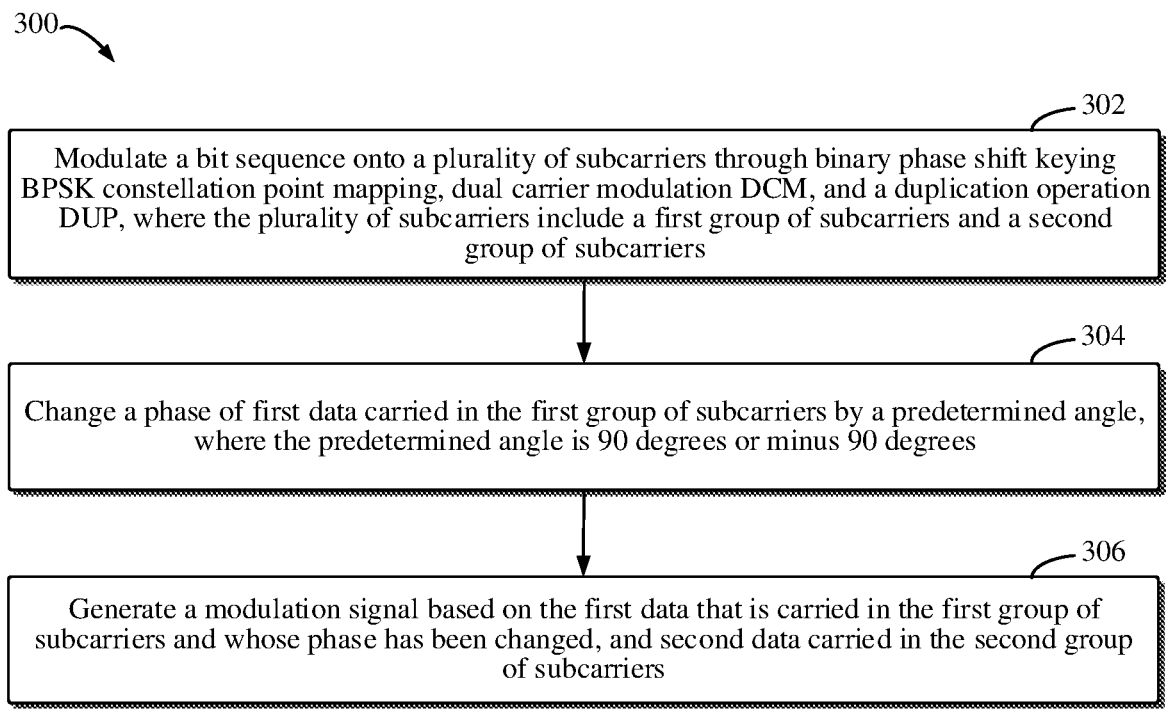
FIG. 3 is an example flowchart of an example process of modulating a signal according to some embodiments of this disclosure.

The following describes a signal modulating process according to embodiments of this disclosure with reference to FIG. 3. FIG. 3 is a flowchart of an example process 300 of modulating a signal according to embodiments of this disclosure. It should be understood that the process 300 may be performed by an appropriate sending device, and an example of the process includes but is not limited to an access point AP 110 or a station STA 120 shown as an example in FIG. 1.

As shown in FIG. 3, in step 302, a sending device modulates a bit sequence onto a plurality of subcarriers through binary phase shift keying BPSK constellation point mapping, dual carrier modulation DCM, and a duplication DUP operation, where the plurality of subcarriers include a first group of subcarriers and a second group of subcarriers.

A 160 MHz bandwidth mode is used as an example. This bandwidth mode corresponds to two RUs 996 (also referred to as 996 RUs, 996-tones), where each RU 996 includes 996 subcarriers, and includes 980 data subcarriers and 16 pilot subcarriers. First, 490 bits may be selected from a to-be-modulated bit sequence, and BPSK constellation point mapping is performed on the 490 bits, to obtain a frequency domain sequence with a length of 490.

Further, the sending device may perform a DCM modulation on the frequency domain sequence (also referred to as a basic frequency domain sequence for ease of description), to generate another frequency domain sequence (also referred to as a duplicated frequency domain sequence for ease of description). Specifically, a correspondence between an element in the duplicated frequency domain sequence and an element in the basic frequency domain sequence may be represented as:

$$d'_{k+490} = d_k \times (-1)^k \quad (3)$$

$d_k$ represents a $k^{th}$ element in the basic frequency domain sequence determined through the BPSK mapping, and $d'_{k+490}$ represents a corresponding $k^{th}$ element in the duplicated frequency domain sequence.

The basic frequency domain sequence and the duplicated frequency domain sequence may be combined and mapped to the first RU 996, to determine 980 data carried in all data subcarriers in the RU 996.

Further, data on the second RU 996 may be determined according to the following relationship for the data on the first RU 996:

$$\tilde{d}_{k,2} = \begin{cases} -d_{k,1}, & \text{if } 0 \leq k \leq 489 \\ d_{k,1}, & \text{if } 490 \leq k \leq 979 \end{cases} \quad (4)$$

$d_{k,1}$ represents data carried in the $k^{th}$ data subcarrier in the first RU 996, and $\tilde{d}_{k,2}$ represents data carried in the $k^{th}$ data subcarrier in the second RU 996. Based on the foregoing process, data carried in a plurality of subcarriers in the two RUs 996 corresponding to the 160 MHz bandwidth may be determined.

In addition, a current standard already supports a 320 MHz bandwidth mode, and the 320 MHz bandwidth mode corresponds to four RUs 996, where each RU 996 includes 980 data subcarriers and 16 pilot subcarriers.

In a modulating process, first, 980 bits may be selected from a to-be-modulated bit sequence, and BPSK constellation point mapping is performed on the 980 bits, to obtain a frequency domain sequence with a length of 980.

Further, the frequency domain sequence may be divided into two sub frequency domain sequences, and a length of each sub frequency domain sequence is 490. A DCM modulation is performed on, according to the following formula, each sub frequency domain sequence, to generate a duplicated sub frequency domain sequence corresponding to the sub frequency domain sequence.

$$d'_{k+490} = d_k \times (-1)^k \quad (5)$$

$d_k$ represents a $k^{th}$ element in the sub frequency domain sequence, and $d'_{k+490}$ represents a corresponding $k^{th}$ element in the duplicated sub frequency domain sequence.

A combination of a sub frequency domain sequence and a corresponding duplicated sub frequency domain sequence may be mapped to a data subcarrier in the first RU 996, and a combination of another sub frequency domain sequence and a corresponding duplicated sub frequency domain sequence may be mapped to a data subcarrier in the second RU 996, so that 2*980 pieces of data carried in all data subcarriers in the two RUs 996 may be determined.

Further, data carried in data subcarriers in the third RU 996 and the fourth RU 996 may be determined based on a DUP process according to data carried in data subcarriers in the first RU 996 and the second RU 996. Specifically, data in the third RU 996 may be obtained by negating corresponding data in the first RU 996, and data in the fourth RU 996 may be obtained by duplicating corresponding data in the second RU 996. Based on the foregoing process, data carried in data subcarriers in the four RUs 996 corresponding to the 320 MHz bandwidth may be determined.

In addition, the sending device may further determine a value carried in a pilot subcarrier in each RU 996, where the value carried in the pilot subcarrier may be used for a subsequent channel estimation.

In step 304, the sending device changes a phase of the first data carried in the first group of subcarriers by a predetermined angle, where the predetermined angle is 90 degrees or minus 90 degrees. Specifically, to fully use an I channel and a Q channel in a signal sending process, the sending device may convert a real value carried in some subcarriers into an imaginary value. The I channel and the Q channel are used for transmitting two signals whose phases are orthogonal. Usually, one channel may be used for transmitting a real-number part represented by a complex number, and the other channel may transmit an imaginary-number part represented by the complex number.

In some embodiments, the sending device may multiply, by i, a value carried in a subcarrier with an odd sequence number, that is, change a phase of data by 90 degrees, without changing a value carried in a subcarrier with an even sequence number.

The 160 MHz bandwidth mode is used as an example. For example, the sending device multiplies, by i, a value in a subcarrier whose location sequence number of the subcarrier is 2k+1 (−506≤k≤505), to convert the value into an imaginary value. The 320 MHz bandwidth mode is used as an example. For example, the sending device multiplies, by i, a value in a subcarrier whose location sequence number of the subcarrier is 2k+1 (−1018≤k≤1017), to convert the value into an imaginary value.

In some embodiments, the sending device may multiply, by −i, a value of data carried in a subcarrier with an odd sequence number, that is, rotate a phase of the value by −90 degrees, without changing a phase of the value carried in the subcarrier with the odd sequence number.

The 160 MHz bandwidth mode is used as an example. For example, the sending device multiplies, by −i, a value of data in a subcarrier whose location sequence number is 2k+1 (−506≤k≤505), to convert the value into an imaginary value. The 320 MHz bandwidth mode is used as an example. For example, the sending device multiplies, by −i, a value of data carried in a subcarrier whose location sequence number of the subcarrier is 2k+1 (−1018≤k≤1017), to convert the value into an imaginary value.

In some embodiments, the sending device may multiply, by i, a value of data carried in a subcarrier with an even sequence number, that is, change a phase of the data by 90 degrees, without changing a value of data carried in the subcarrier with an even sequence number.

The 160 MHz bandwidth mode is used as an example. For example, the sending device multiplies, by i, a value of data carried in a subcarrier whose subcarrier location sequence number is 2k (−506≤k≤506), to convert the value into an imaginary value. The 320 MHz bandwidth mode is used as an example. For example, the sending device multiplies, by i, a value of data carried in a subcarrier whose subcarrier location sequence number is 2k (−1018≤k≤1018), to convert the value into an imaginary value.

In some embodiments, the sending device may multiply, by −i, a value of data carried in an even-numbered subcarrier, that is, rotate a phase of the value by −90 degrees, without changing a phase of a value carried in an odd-numbered subcarrier.

The 160 MHz bandwidth mode is used as an example. For example, the sending device multiplies, by −i, a value of data carried in a subcarrier whose subcarrier location sequence number is 2k (−506≤k≤506), to convert the value into an imaginary value. The 320 MHz bandwidth mode is used as an example. For example, the sending device multiplies, by −i, a value of data carried in a subcarrier whose subcarrier location sequence number is 2k (−1018≤k≤1018), to convert the value into an imaginary value.

In step 306, the sending device generates a modulation signal based on the first data that is carried in the first group of subcarriers and whose phase has been changed and second data carried in the second group of subcarriers. Specifically, the sending device may convert, for example, frequency domain data into time domain data through IDFT, to generate the modulation signal.

In some embodiments, the sending device sends the modulation signal to the receiving device, to implement a data transmission.

Based on the foregoing discussed process, in embodiments of this disclosure, data carried in a subcarrier can be converted from a single real value to a combination of a real number and an imaginary number, so that both the I channel and the Q channel can be fully used in a signal transmission process, to enhance a diversity gain of a system. In addition, the solution of this disclosure does not change a conventional BPSK, a DCM, and a DUP module, so that the solution of this disclosure can be well applicable to a device based on an existing standard.

Figure 4:
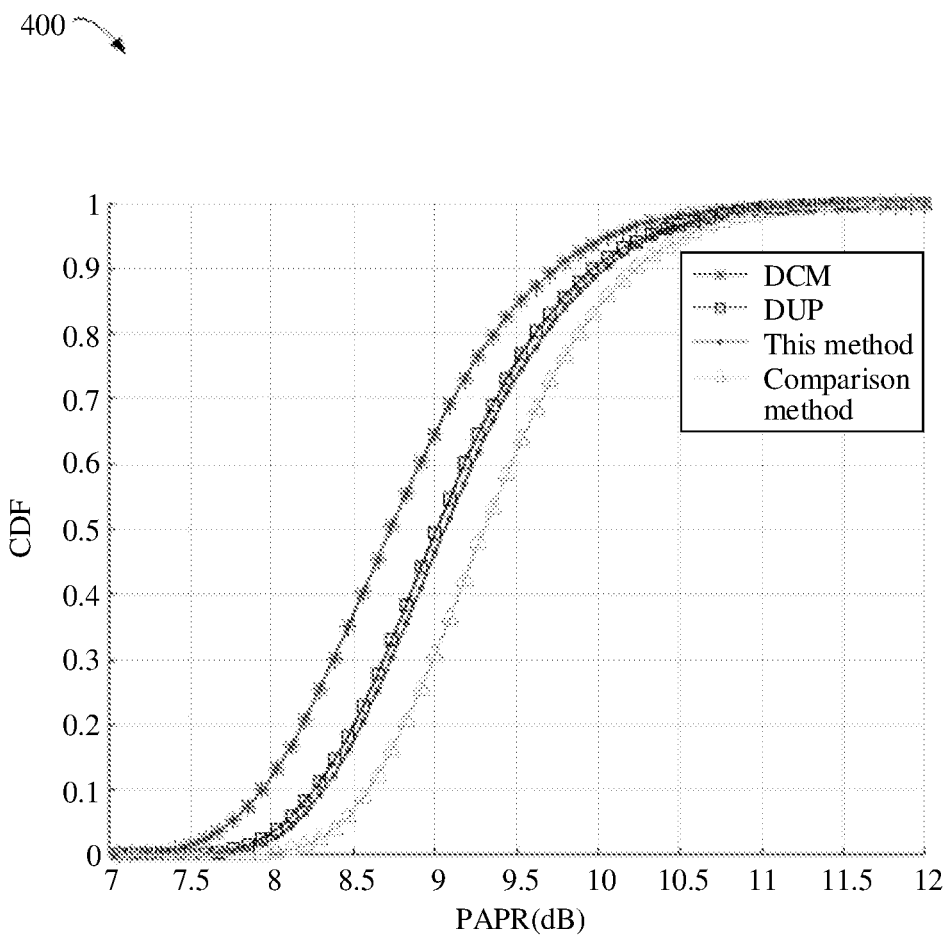
FIG. 4 is an example schematic diagram of CDF simulation comparison of PAPRs according to some embodiments of this disclosure.

In addition, it can be found from an experiment that embodiments of this disclosure have little impact on a peak-to-average power ratio PAPR distribution. FIG. 4 is a schematic diagram 400 of cumulative distribution function CDF simulation comparison of PAPRs. Specifically, in this disclosure, a DUP mode of 160 M is used as an example, and PAPR results of a conventional DCM solution, a DUP solution, a solution of this disclosure, and another comparison solution are compared. The comparison solution utilizes both an I channel and a Q channel through rotated BPSK constellation mapping.

Specifically, in a CDF simulation process in FIG. 4, a solution specifically used in this disclosure is multiplying, by i, a value on a subcarrier with an odd sequence number. By fully utilizing the I channel and the Q channel, the solution of this disclosure can significantly improve a diversity gain of a system. In addition, it can be learned from FIG. 4 that this disclosure does not reduce a PAPR of the system while improving the diversity gain of the system, and the PAPR result of this disclosure is significantly better than that of the comparison solution. Therefore, in the solution of this disclosure, the diversity gain of the system is enhanced on the basis of ensuring a PAPR.

According to embodiments of this disclosure, a signal demodulating solution is further provided. Specifically, in a signal demodulating process, the receiving device obtains first data carried in a first group of subcarriers and second data carried in a second group of subcarriers in a plurality of subcarriers. Then, the receiving device changes a phase of the first data by a predetermined angle, where the predetermined angle is 90 degrees or minus 90 degrees, and then determines, based on the first data and the second data changed by the phase, a bit sequence.

Figure 5:
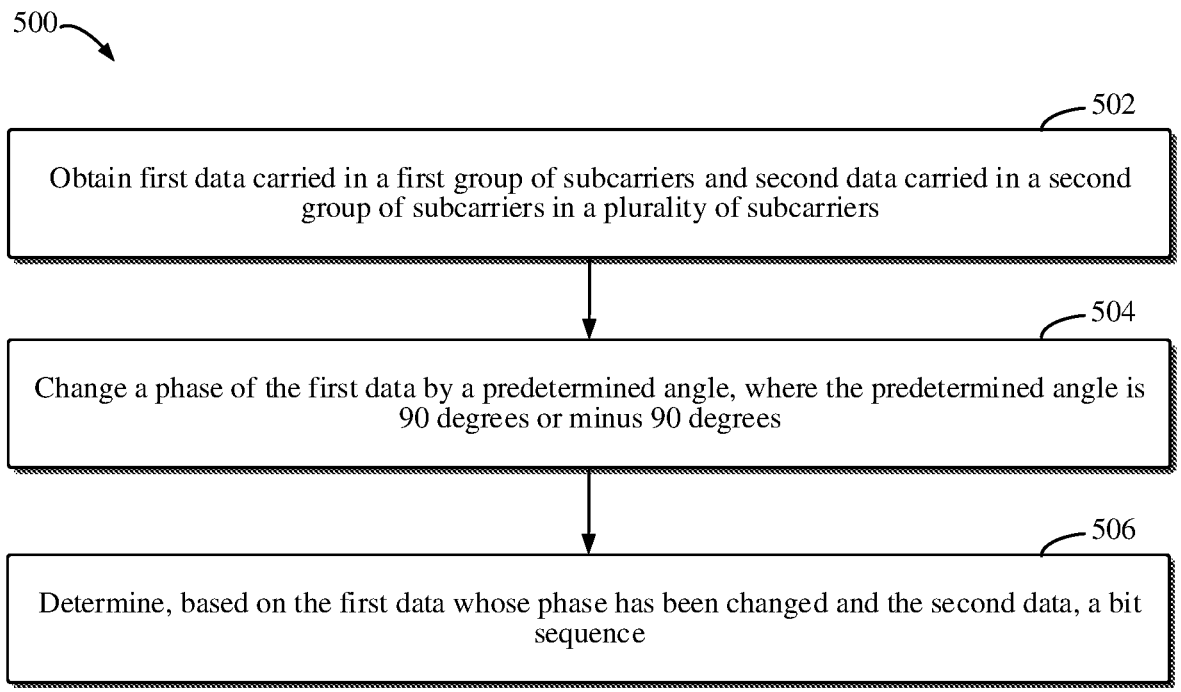
FIG. 5 is an example flowchart of an example process of demodulating a signal according to some embodiments of this disclosure.

The following describes a signal demodulating process according to embodiments of this disclosure with reference to FIG. 5. FIG. 5 is a flowchart of an example process 500 of demodulating a signal according to embodiments of this disclosure. It should be understood that the process 500 may be performed by an appropriate receiving device, and an example of the process includes, but is not limited to, the access point AP 110 or the station STA 120 shown as an example in FIG. 1.

As shown in FIG. 5, in step 502, the receiving device obtains first data carried in a first group of subcarriers and second data carried in a second group of subcarriers in a plurality of subcarriers.

Specifically, the receiving device may receive a signal sent by a sending device. After performing processing such as down-conversion and synchronization on the signal, the receiving device may transform time domain data into frequency domain data through discrete Fourier transform DFT, to obtain data carried in each subcarrier.

In step 504, the receiving device changes a phase of the first data by a predetermined angle, where the predetermined angle is 90 degrees or minus 90 degrees.

Specifically, the receiving device may perform a corresponding phase change according to a phase change rule of a sending device end. In some embodiments, the sending device may multiply, by −i, a value carried in a subcarrier with an odd sequence number, that is, change a phase of data by −90 degrees, without changing a value carried in a subcarrier with an even sequence number.

The 160 MHz bandwidth mode is used as an example. For example, the sending device multiplies, by −i, a value in a subcarrier whose location sequence number of the subcarrier is 2k+1 (−506≤k≤505). The 320 MHz bandwidth mode is used as an example. For example, the sending device multiplies, by −i, a value in a subcarrier whose location sequence number of the subcarrier is 2k+1 (−1018≤k≤1017).

In some embodiments, the sending device may multiply, by i, a value carried in a subcarrier with an odd sequence number, that is, change a phase of data by 90 degrees, without changing a value carried in the subcarrier with an odd sequence number.

The 160 MHz bandwidth mode is used as an example. For example, the sending device multiplies, by i, a value in a subcarrier whose location sequence number of the subcarrier is 2k+1 (−506≤k≤505). The 320 MHz bandwidth mode is used as an example. For example, the sending device multiplies, by i, a value in a subcarrier whose location sequence number of the subcarrier is 2k+1 (−1018≤k≤1017).

In some embodiments, the sending device may multiply, by −i, a value carried in a subcarrier with an even sequence number, that is, change a phase of data by 90 degrees, without changing a value carried in the subcarrier with an even sequence number.

The 160 MHz bandwidth mode is used as an example. For example, the sending device multiplies, by −i, a value in a subcarrier whose location sequence number of the subcarrier is 2k (−506≤k≤506). The 320 MHz bandwidth mode is used as an example. For example, the sending device multiplies, by −i, a value in a subcarrier whose location sequence number of the subcarrier is 2k (−1018≤k≤1018).

In some embodiments, the sending device may multiply, by i, a value carried in a subcarrier with an even sequence number, that is, change a phase of data by 90 degrees, without changing a value carried in a subcarrier with an odd sequence number.

The 160 MHz bandwidth mode is used as an example. For example, the sending device multiplies, by i, a value on a subcarrier whose location sequence number is 2k (−506≤k≤506). The 320 MHz bandwidth mode is used as an example. For example, the sending device multiplies, by i, a value on a subcarrier whose location sequence number is 2k (−1018≤k≤1018).

In step 506, the receiving device determines, based on the second data and the first data whose phase has been changed, a bit sequence.

In some implementations, because the sending device duplicates four pieces of data in a modulating process, the receiving device may determine, based on one of the data, the bit sequence. The 160 MHz bandwidth mode is used as an example. The receiving device may perform BSPK constellation demapping on a value of 480 data subcarriers in the first RU 996 after phase retrieval, to determine a bit sequence corresponding to a signal.

In some implementations, the receiving device may further determine, according to a maximum ratio combining algorithm, the bit sequence. Specifically, in the 160 MHz bandwidth mode, the data obtained after the phase transformation may be represented as $y_0, y_1, y_2, \ldots,$ and $y_{1959}$, and the receiving device may obtain $N_{sd}$ estimation results of the constellation points according to the following formula:

$$\hat{s} = \frac{h_i^* \times y_i + (-1)^i \times h_{i+N_{sd}}^* \times y_{i+N_{sd}} - h_{i+2N_{sd}}^* \times y_{i+2N_{sd}} + (-1)^i \times h_{i+3N_{sd}}^* \times y_{i+3N_{sd}}}{|h_i|^2 + |h_{i+N_{sd}}|^2 + |h_{i+2N_{sd}}|^2 + |h_{i+3N_{sd}}|^2} \quad (6)$$

$0 \leq i \leq N_{sd}-1$, $h_i$ is a channel estimation result corresponding to an $i^{th}$ subcarrier, $h^*_i$ is a conjugate of $h_i$, and in a 160 MHz bandwidth mode, $N_{sd}=490$.

For the 320 MHz bandwidth mode, the data after the phase transformation may be represented as $y_0, y_1, y_2, \ldots,$ and $y_{3919}$, and the receiving device may obtain $N_{sd}$ estimation results of the constellation points according to the following formula:

$$\hat{s} = \frac{h_i^* \times y_i + (-1)^i \times h_{i+0.5N_{sd}}^* \times y_{i+0.5N_{sd}} - h_{i+2N_{sd}}^* \times y_{i+2N_{sd}} + (-1)^i \times h_{i+2.5N_{sd}}^* \times y_{i+2.5}}{|h_i|^2 + |h_{i+0.5N_{sd}}|^2 + |h_{i+2N_{sd}}|^2 + |h_{i+2.5N_{sd}}|^2} \quad (7)$$

$0 \leq i \leq N_{sd}-1$, $h_i$ is a channel estimation result corresponding to the $i^{th}$ subcarrier, $h^*_i$ is a conjugate of $h_i$, and in a 320 MHz bandwidth mode, $N_{sd}=980$.

Then, the receiving device may calculate, based on a result of a constellation point estimation, an log-likelihood ratio (LLR) of each bit and send the LLR to a channel decoding module for decoding, to restore and obtain a bit sequence.

Second Implementation of this Disclosure

According to another example embodiment of this disclosure, an improved signal modulating and demodulating solution is provided. Specifically, in a signal modulating process, the sending device determines, through quadrature phase shift keying QPSK constellation point mapping, the at least one first frequency domain sequence corresponding to the bit sequence. Then, the sending device determines, based on a complex number transformation on the at least one first frequency domain sequence, at least one second frequency domain sequence, and determines, based on the at least one first frequency domain sequence and the at least one second frequency domain sequence through at least one of dual carrier modulation DCM and a duplication DUP operation, the data carried in a plurality of subcarriers. Further, the sending device may generate a modulation signal based on data carried in the plurality of subcarriers.

Figure 6:
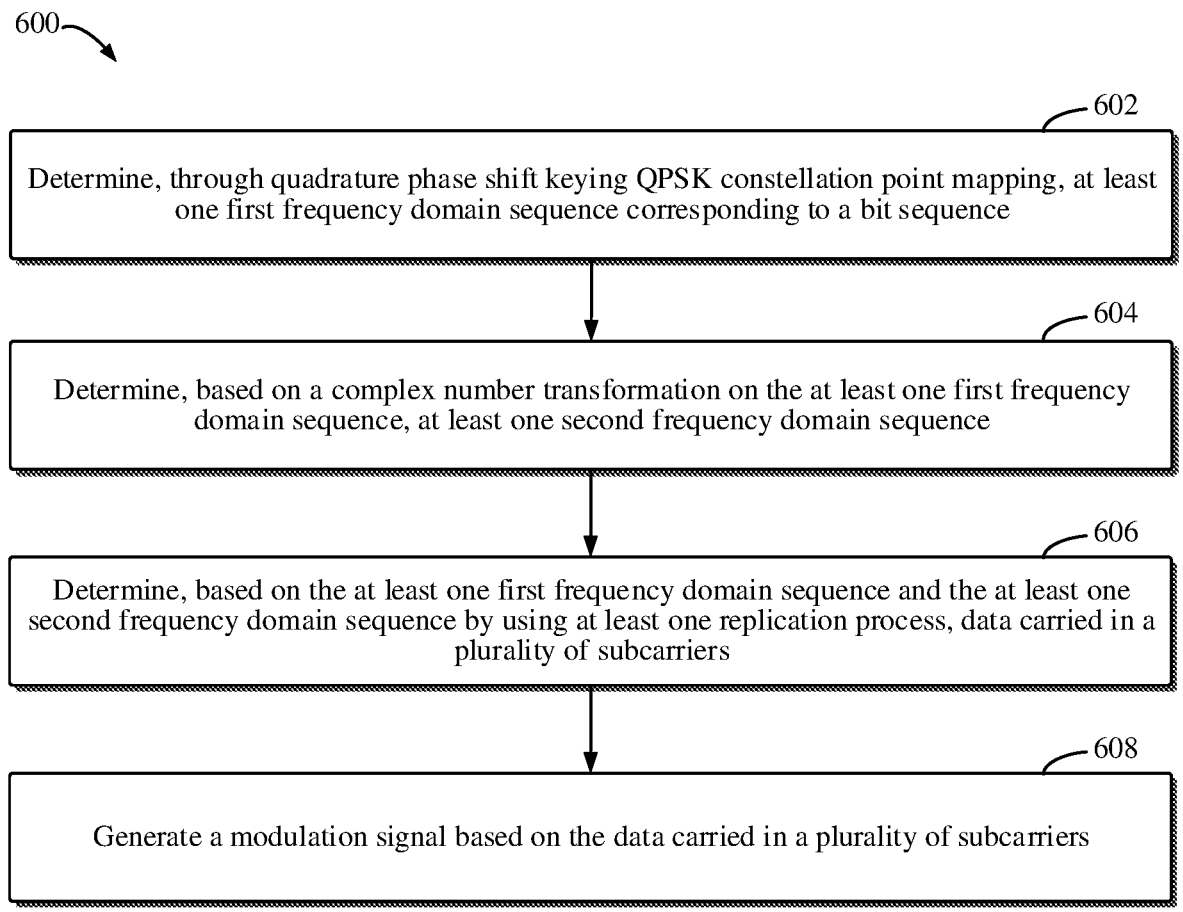
FIG. 6 is an example flowchart of an example process of modulating a signal according to some other embodiments of this disclosure.

The following describes a signal modulating process according to embodiments of this disclosure with reference to FIG. 6. FIG. 6 is a flowchart of an example process 600 of modulating a signal according to embodiments of this disclosure. It should be understood that the process 600 may be performed by an appropriate sending device, and an example of the process includes but is not limited to an access point AP 110 or a station STA 120 shown as an example in FIG. 1.

As shown in FIG. 6, in step 602, a sending device determines, through quadrature phase shift keying (QPSK) constellation point mapping, at least one first frequency domain sequence corresponding to a bit sequence.

In some implementations, it is different from through BPSK constellation point mapping that, in an implementation of a second aspect of this disclosure, a frequency domain sequence corresponding to the bit sequence may be determined through the QPSK constellation point mapping. A 160 MHz bandwidth mode is used as an example, and the bandwidth mode corresponds to two RUs 996, where each RU 996 includes 980 data subcarriers and 16 pilot subcarriers. The sending device may select 490 bits from a to-be-modulated bit sequence, and perform the QPSK constellation point mapping on the 490 bits, to obtain a frequency domain sequence with a length of 245, that is, a first frequency domain sequence.

For an example of a 320 MHz bandwidth mode, the sending device may select 980 bits from the to-be-modulated bit sequence, and perform the QPSK constellation point mapping on the 980 bits, to obtain a frequency domain sequence with a length of 450. Further, the sending device may further split the frequency domain sequence with a length of 450 into two frequency domain sequences with a length of 245, that is, two first frequency domain sequences.

In step 604, the sending device determines, based on a complex number transformation on the at least one first frequency domain sequence, at least one second frequency domain sequence.

The 160 MHz bandwidth mode is used as an example. The sending device may perform the complex number transformation on a symbol in the first frequency domain sequence with a length of 245, to generate the second frequency domain sequence with a length of 245. In some embodiments, the complex number transformation may include one transformation of or a combination of a plurality of transformations of a conjugate transformation, swapping between an imaginary part and a real part, and a negation operation.

The 320 MHz bandwidth mode is used as an example. The sending device may separately perform the complex number transformation on two sub frequency domain sequences (that is, the first frequency domain sequence) with a length of 450, to obtain a corresponding second frequency domain sequence. Based on this manner, four frequency domain sequences with a length of 245 may be obtained.

In step 606, the sending device determines, based on the at least one first frequency domain sequence and the at least one second frequency domain sequence through at least one of dual carrier modulation DCM and a duplication DUP operation, the data carried in the plurality of subcarriers.

In some embodiments, the at least one duplication process includes a first duplication process, and the first duplication process enables a value at an odd-numbered location or an even-numbered location in the to-be-duplicated frequency domain sequence to be negated, to generate a duplicated frequency domain sequence. For example, the first duplication process may be performed by a DCM modulation.

In some embodiments, the at least one duplication process includes a second duplication process, and the second duplication process enables a value in a first half part or a second half in the to-be-duplicated frequency domain sequence to be negated, to generate a duplicated frequency domain sequence. For example, the second duplication process may be performed by a duplication DUP operation.

In some embodiments, the sending device may simultaneously perform the first duplication process and the second duplication process. The 160 MHz bandwidth mode is used as an example. The sending device may combine the first frequency domain sequence and the second frequency domain sequence with a length of 245, and perform a DCM modulation on the combined frequency domain sequence (for ease of description, referred to as a combined frequency domain sequence), to obtain the duplicated frequency domain sequence. Specifically, a correspondence between an element in the combined frequency domain sequence and an element in the duplicated frequency domain sequence may be represented as:

$$d'_{k+490} = d_k \times (-1)^k \quad (8)$$

$d_k$ represents a $k^{th}$ element in the combined frequency domain sequence, and $d'_{k+490}$ represents a corresponding $k^{th}$ element in the duplicated frequency domain sequence. The combined frequency domain sequence and the duplicated frequency domain sequence may be combined into a frequency domain sequence (referred to as a third frequency domain sequence for ease of description) with a length of 980.

Further, the fourth frequency domain sequence with a length of 980 may be generated based on the third frequency domain sequence according to the following relationship:

$$\tilde{d}_{k,2} = \begin{cases} -d_{k,1}, & \text{if } 0 \le k \le 489 \\ d_{k,1}, & \text{if } 490 \le k \le 979 \end{cases} \quad (9)$$

$d_{k,1}$ represents data at a $k^{th}$ location in the third frequency domain sequence, and $\tilde{d}_{k,2}$ represents data at a $k^{th}$ location in the determined fourth frequency domain sequence.

Further, the third frequency domain sequence and the fourth frequency domain sequence may be respectively mapped to data subcarriers in the first RU 996 and data subcarriers in the second RU 996, to determine data carried in all the data subcarriers.

In addition, for an example of the 320 MHz bandwidth mode, as discussed above, the sending device may obtain, based on a complex number transformation, two first frequency domain sequences with a length of 245 and two corresponding second frequency domain sequences. Further, the sending device may combine one first frequency domain sequence and a corresponding second frequency domain sequence to obtain a first combined frequency domain sequence with a length of 490, and combine another first frequency domain sequence and a corresponding second frequency domain sequence to obtain a second combined frequency domain sequence with a length of 490.

Further, the sending device may respectively perform a DCM modulation on the first combined frequency domain sequence and the second combined frequency domain sequence according to the following formula, to generate a corresponding first duplicated frequency domain sequence and a corresponding second duplicated frequency domain sequence.

$$d'_{k+490} = d_k \times (-1)^k \quad (10)$$

$d_k$ represents a $k^{th}$ element in the combined frequency domain sequence, and $d'_{k+490}$ represents a $k^{th}$ element corresponding to in the duplicated frequency domain sequence.

Further, the sending device may further process, based on a DUP process, the first combined frequency domain sequence, the second combined frequency domain sequence, the first duplicated frequency domain sequence, and the second duplicated frequency domain sequence whose lengths are all 490. Specifically, the sending device may combine the first combined frequency domain sequence and the first duplicated frequency domain sequence into a fifth frequency domain sequence with a length of 980, and combine the second combined frequency domain sequence and the second duplicated frequency domain sequence into a sixth frequency domain sequence with a length of 980.

Then, based on the DUP process, the sending device may negate the value of the fifth frequency domain sequence to obtain the seventh frequency domain sequence with a length of 980, and directly duplicate the sixth frequency domain sequence to obtain an eighth frequency domain sequence with a length of 980.

Then, the fifth frequency domain sequence, the sixth frequency domain sequence, the seventh frequency domain sequence, and the eighth frequency domain sequence that have a length of 980 may be respectively mapped to data subcarriers in the four RUs 996, to determine values of a plurality of data subcarriers.

In some embodiments, the sending device may perform only one of the first duplication process and the second duplication process. It should be understood that when only one duplication process is performed, a same resource may carry more data. A 160 MHz bandwidth is used as an example. It is different from a process of performing two duplication processes, the sending device may obtain a bit sequence with a length of 980, and convert the bit sequence into a first frequency domain sequence with a length of 490 through QPSK constellation mapping.

Then, the sending device may perform the complex number transformation discussed above on the first frequency domain sequence, to determine the second frequency domain sequence with a length of 490. Then, the first frequency domain sequence and the second frequency domain sequence may be combined into a frequency domain sequence with a length of 980, and another frequency domain sequence with a length of 980 may be generated based on the first duplication process or the second duplication process.

Further, the two frequency domain sequences with a length of 980 may be mapped to data subcarriers in the two RUs 996, to determine values carried in a plurality of subcarriers corresponding to the 160 MHz bandwidth mode. It should be understood that the 320 MHz bandwidth mode or another suitable bandwidth mode may similarly perform only one duplication process.

In step 608, the sending device generates a modulation signal based on data carried in the plurality of subcarriers. Specifically, the sending device converts, for example, through inverse discrete Fourier transform, values carried in a plurality of subcarriers into time domain, to generate the modulation signal. In some embodiments, the sending device may further send the modulation signal to a receiving device.

Based on the method discussed above, compared with a conventional solution, data is repeatedly sent on a frequency domain resource for more times, significantly improving a diversity gain of a system.

Figure 7:
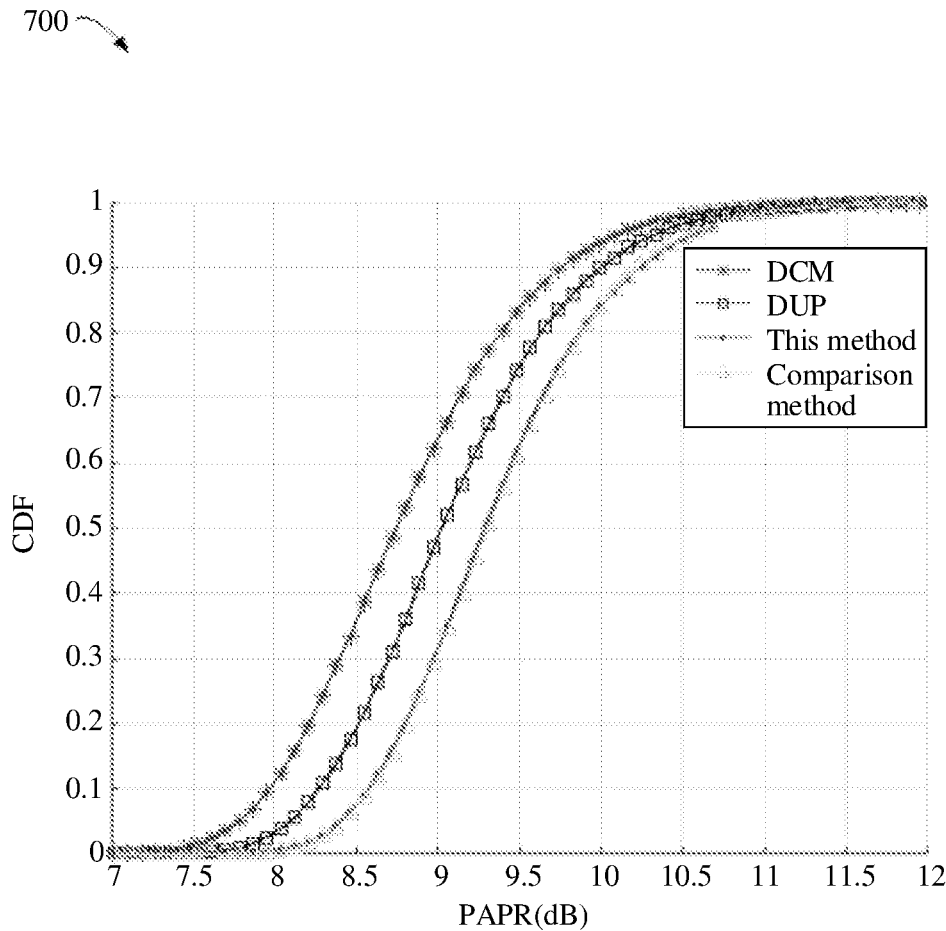
FIG. 7 is an example schematic diagram of CDF simulation comparison of a PAPR according to some other embodiments of this disclosure.

In addition, it can be found from an experiment that embodiments of this disclosure have little impact on a peak-to-average power ratio (PAPR) distribution compared with the comparison solution discussed above. FIG. 7 is a schematic diagram 700 of cumulative distribution function (CDF) simulation comparison of PAPRs. In one aspect, a modulation is performed through QPSK, so that the solutions of this disclosure can significantly improve resource utilization efficiency of a system, and improve a diversity gain of the system. In addition, it can be learned from FIG. 7 that, in this disclosure, the diversity gain of the system is improved, and a PAPR result of this disclosure is basically consistent with that in the comparison solution. Therefore, in the solution of this disclosure, the diversity gain of the system is enhanced on the basis of ensuring a PAPR.

Figure 8:
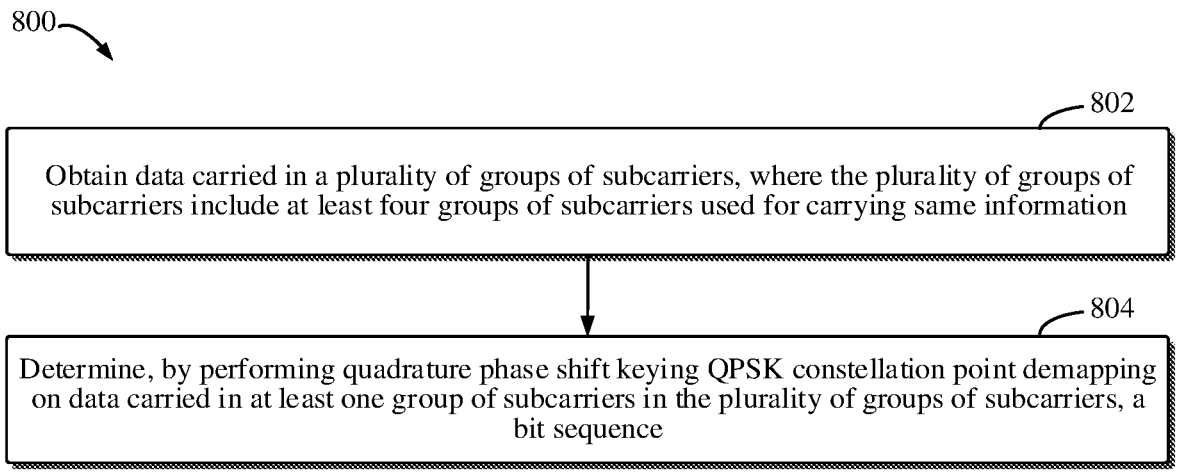
FIG. 8 is an example flowchart of an example process of demodulating a signal according to some other embodiments of this disclosure.

According to embodiments of this disclosure, a signal demodulating solution is further provided. Specifically, in a process of demodulating a signal, the receiving device obtains data carried in a plurality of groups of subcarriers, where the plurality of groups of subcarriers include at least four groups of subcarriers used for carrying same information; and determines, based on the data carried in the at least one group of the plurality of groups of subcarriers, a bit sequence through quadrature phase shift keying (QPSK) constellation point demapping The following describes a signal demodulating process according to embodiments of this disclosure with reference to FIG. 8. FIG. 8 is a flowchart of an example process 800 of demodulating a signal according to embodiments of this disclosure. It should be understood that the process 800 may be performed by an appropriate receiving device, and an example of the process includes, but is not limited to, the access point AP 110 or the station STA 120 shown as an example in FIG. 1.

As shown in FIG. 8, in step 802, the receiving device obtains data carried in a plurality of groups of subcarriers, where the plurality of groups of subcarriers include at least four groups of subcarriers used for carrying same information. For example, a quantity of subcarrier groups is a multiple of 4.

Specifically, the receiving device may receive a signal from the sending device. After receiving the signal, the receiving device may perform processing such as down-conversion and synchronization, and transform time domain data into frequency domain data through discrete Fourier transform (DFT), to obtain data carried in each subcarrier. Correspondingly, according to a signal modulating method, these subcarriers may be correspondingly divided into a plurality of groups based on a sequence. For example, the sending device performs a modulation through QPSK in combination with the DCM and the DUP, and the receiving device may obtain eight groups of data carried in subcarriers. On the contrary, when the sending device performs the modulation through QPSK in combination with the DCM or the DUP, the data is duplicated four times in frequency domain. Correspondingly, the sending device may obtain the data carried in the four groups of subcarriers.

In step 804, the receiving device determines, based on data carried in at least one group of subcarriers in the plurality of groups of subcarriers, a bit sequence corresponding to the received signal through quadrature phase shift keying (QPSK) constellation point demapping.

That the sending device performs a modulation through the QPSK in combination with the DCM and the DUP is still used as an example. After the QPSK constellation mapping is used, and values are assigned through the DCM modulation and the DUP, data is duplicated eight times in frequency domain, and corresponds to eight different groups of subcarriers. In some embodiments, the receiving device may determine, based on one piece of data, the bit sequence. The 160 MHz bandwidth mode is used as an example. A first group of subcarriers in eight groups of subcarriers carries a first frequency domain sequence corresponding to an original bit sequence, a second group of subcarriers carries a second frequency domain sequence obtained by performing a complex number transformation, a third group of subcarriers carries a third frequency domain sequence obtained by performing the DCM modulation on the first frequency domain sequence, and a fourth group of subcarriers carries a fourth frequency domain sequence obtained by performing the DCM on the second frequency domain sequence, a fifth group of subcarriers carries a fifth frequency domain sequence obtained by negating the first frequency domain sequence, a sixth group of subcarriers carries a sixth frequency domain sequence obtained by negating the second frequency domain sequence, a seventh group of subcarriers carries a seventh frequency domain sequence obtained by duplicating the third frequency domain sequence, and an eighth group of subcarriers carries an eighth frequency domain sequence obtained by duplicating the fourth frequency domain sequence. Correspondingly, the receiving device may perform, for example, QPSK constellation demapping on the first frequency domain sequence to obtain a corresponding bit sequence.

In some implementations, the receiving device may further determine, according to a maximum ratio combining algorithm, the bit sequence. Correspondingly, the receiving device may perform, on subcarriers in a predetermined group of the eight groups of subcarriers, a complex number inverse transformation corresponding to the complex number transformation used in the modulation phase.

The 160 MHz bandwidth mode is used as an example. The receiving device may perform a complex number inverse transformation on the second frequency domain sequence carried in the second group of subcarriers, the fourth frequency domain sequence carried in the fourth group of subcarriers, the sixth frequency domain sequence carried in the sixth group of subcarriers, and the eighth frequency domain sequence carried in the eighth group of subcarriers. In some embodiments, the complex number inverse transformation may include one transformation of or a combination of a plurality of transformations of a conjugate transformation, swapping between an imaginary part and a real part, and a negation operation.

The data obtained after the inverse transformation may be represented as $y_0, y_1, y_2, \ldots,$ and $y_{1959}$. Further, in the 160 MHz bandwidth mode, the receiving device may obtain $N_{sd}$ estimation results of the constellation points according to the following formula:

$$\hat{s} = \frac{\begin{array}{l}h_i^* \times y_i + h_{i+N_{sd}}^* \times y_{i+N_{sd}} + (-1)^i \times h_{i+2N_{sd}}^* \times \\ y_{i+2N_{sd}} + (-1)^{i+N_{sd}} \times h_{i+3N_{sd}}^* \times y_{i+3N_{sd}} - \\ h_{i+4N_{sd}}^* \times y_{i+4N_{sd}} - h_{i+5N_{sd}}^* \times y_{i+5N_{sd}} + (-1)^i \times \\ h_{i+6N_{sd}}^* \times y_{i+6N_{sd}} + (-1)^{i+N_{sd}} \times h_{i+7N_{sd}}^* \times y_{i+7N_{sd}}\end{array}}{\begin{array}{l}|h_i|^2 + |h_{i+N_{sd}}|^2 + |h_{i+2N_{sd}}|^2 + |h_{i+3N_{sd}}|^2 + \\ |h_{i+4N_{sd}}|^2 + |h_{i+5N_{sd}}|^2 + |h_{i+6N_{sd}}|^2 + |h_{i+7N_{sd}}|^2\end{array}} \quad (11)$$

$0 \leq i \leq N_{sd}-1$, $h_i$ is a channel estimation result corresponding to the $i^{th}$ subcarrier, $h_i^*$ is a conjugate of $h_i$, and in a 160 MHz bandwidth mode, $N_{sd}=245$.

Then, the receiving device may calculate, based on a result of a constellation point estimation, an LLR of each bit, and send the LLR to the channel decoding module for decoding, to restore and obtain the bit sequence.

For the 320 MHz bandwidth mode, similarly, the receiving device may first perform the inverse complex transformation on data carried in a predetermined subcarrier, and simultaneously restore data of symbol flipping during DCM encoding and DUP duplication, to obtain restored data $y_0$, $y_1$, $y_2$, ..., and $y_{3919}$. Further, the receiving device may determine $N_{sd}$ results of the constellation point estimation according to the following formula:

$$\hat{s} = \frac{\sum_{n=0}^{7} h^*_{i(n)} \times y_{i(n)}}{\sum_{n=0}^{7} |h_{i(n)}|^2} \quad (12)$$

$0 \leq i \leq N_{sd}-1$, $h_{i(n)}$ is a channel estimation result corresponding to an $i(n)^{th}$ subcarrier, $h^*_{i(n)}$ is a conjugate of $h_{i(n)}$, $i(n) = i + nN_{sd}$, and in the 320 MHz bandwidth mode, $N_{sd} = 490$.

Then, the receiving device may calculate, based on a result of a constellation point estimation, an LLR of each bit, and send the LLR to the channel decoding module for decoding, to restore and obtain the bit sequence.

It should be understood that when the sending device performs the modulation through the QPSK in combination with the DCM or the DUP, the sending device may restore, based on a similar process, data carried in the four groups of subcarriers, to restore and obtain a bit sequence.

Example Apparatus and Device

Figure 9:
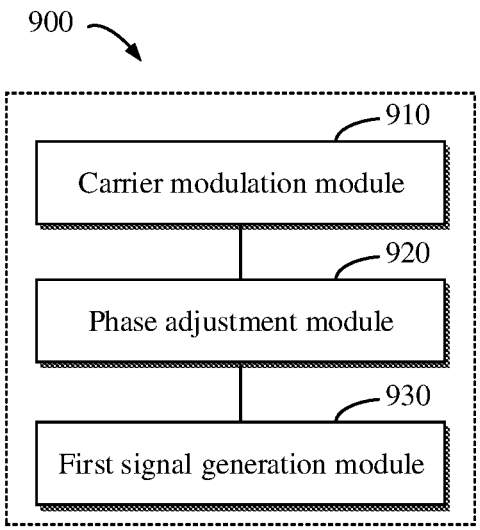
FIG. 9 is an example schematic block diagram of a sending device according to some embodiments of this disclosure.

FIG. 9 is a schematic block diagram of a sending device 900 according to some embodiments of this disclosure. As shown in FIG. 9, the sending device 900 includes: a carrier modulation module 910, configured to modulate a bit sequence onto a plurality of subcarriers through binary phase shift keying BPSK constellation point mapping, dual carrier modulation DCM, and a duplication DUP operation, where the plurality of subcarriers include a first group of subcarriers and a second group of subcarriers; a phase adjustment module 920, configured to change a phase of first data carried in the first group of subcarriers by a predetermined angle, where the predetermined angle is 90 degrees or minus 90 degrees; and a first signal generation module 930, configured to generate a modulation signal based on first data that is carried in a first group of subcarriers and whose phase has been changed and second data carried in a second group of subcarriers.

It should be understood that a corresponding module in the sending device 900 may be further configured to implement another process or step of modulating the signal discussed in the first implementation. For specific details, refer to the foregoing related descriptions.

Figure 10:
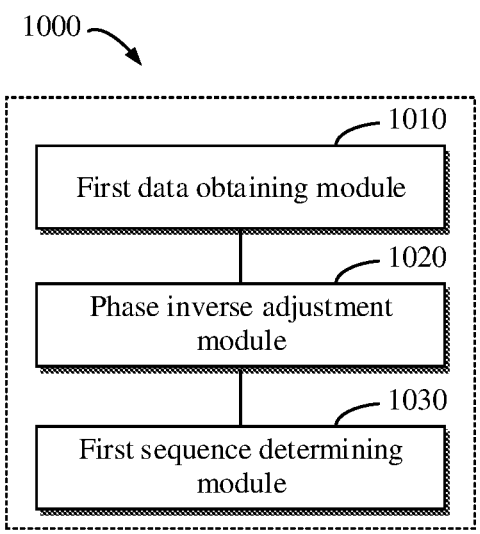
FIG. 10 is an example schematic block diagram of a receiving device according to some embodiments of this disclosure.

FIG. 10 is a schematic block diagram of a receiving device 1000 according to some embodiments of this disclosure. As shown in FIG. 10, the receiving device 1000 includes: a first data obtaining module 1010, configured to determine first data carried in a first group of subcarriers in a plurality of subcarriers and second data carried in a second group of subcarriers; a phase inverse adjustment module 1020, configured to change a phase of the first data by a predetermined angle, where the predetermined angle is 90 degrees or minus 90 degrees; and a first sequence determining module 1030, configured to determine a bit sequence based on the first data whose phase has been changed and the second data.

It should be understood that a corresponding module in the receiving device 1000 may be further configured to implement another process or step of demodulating the signal discussed in the first implementation. For specific details, refer to the foregoing related descriptions.

Figure 11:
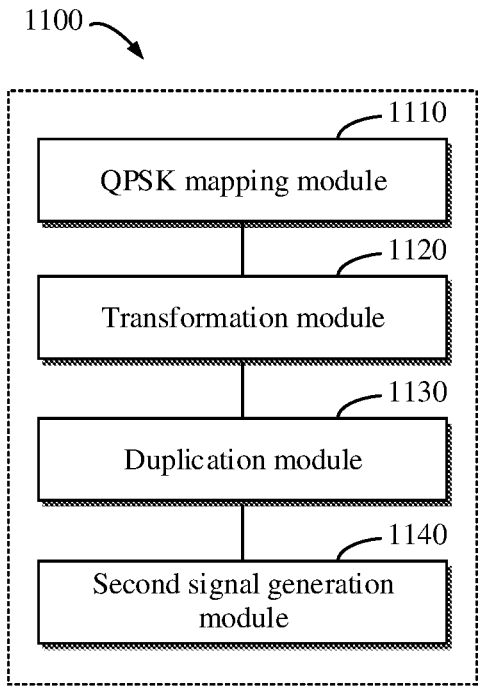
FIG. 11 is an example schematic block diagram of a sending device according to some other embodiments of this disclosure.

FIG. 11 is a schematic block diagram of a sending device 1100 according to some embodiments of this disclosure. As shown in FIG. 11, the sending device 1100 includes: a QPSK mapping module 1110, configured to determine, through quadrature phase shift keying QPSK constellation point mapping, at least one first frequency domain sequence corresponding to a bit sequence; a transformation module 1120, configured to determine at least one second frequency domain sequence based on a complex number transformation on the at least one first frequency domain sequence; a duplication module 1130, configured to determine, based on at least one first frequency domain sequence and at least one second frequency domain sequence through at least one of dual carrier modulation DCM and a duplication DUP operation, data carried in a plurality of subcarriers; and a second signal generation module 1140, configured to generate a modulation signal based on the data carried in the plurality of subcarriers.

It should be understood that a corresponding module in the sending device 1100 may be further configured to implement another process or step of modulating the signal discussed in the second implementation. For specific details, refer to the foregoing related descriptions.

Figure 12:
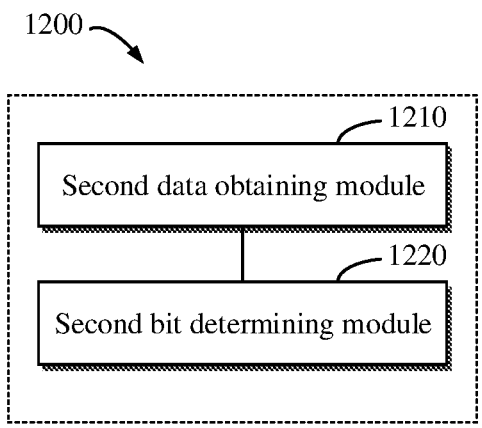
FIG. 12 is an example schematic block diagram of a receiving device according to some other embodiments of this disclosure.

FIG. 12 is a schematic block diagram of a receiving device 1200 according to some embodiments of this disclosure. As shown in FIG. 10, the receiving device 1200 includes: a second data obtaining module 1210, configured to obtain data carried in a plurality of groups of subcarriers, where the plurality of groups of subcarriers are used for carrying same information; and a second sequence determining module 1220 (or second bit determining module 1220), configured to determine, based on data carried in at least one group of the plurality of groups of subcarriers, a bit sequence through quadrature phase shift keying (QPSK) constellation point demapping.

It should be understood that a corresponding module in the receiving device 1200 may be further configured to implement another process or step of demodulating the signal discussed in the foregoing second implementation. For specific details, refer to the foregoing related descriptions.

It should be understood that the sending device 900/1100 and/or the receiving device 1000/1200 discussed above may be implemented by using an application-specific integrated circuit, one or more FPGAs (field programmable gate arrays), a PLD (programmable logic device), a controller, a state machine, a gate logic, a discrete hardware component, any other suitable circuit, or any combination of circuits that can perform various processes of this disclosure, a chip, a board, a communication device, or the like.

Figure 13:
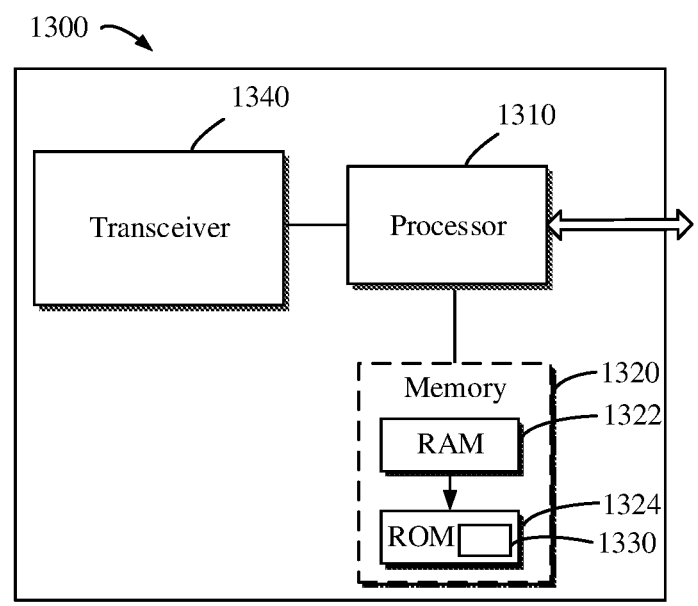
FIG. 13 is an example simplified block diagram of an example device suitable for implementing some embodiments of this disclosure.

FIG. 13 is a simplified block diagram of an example device 1300 suitable for implementing embodiments of this disclosure. A device 1300 may be a receiving device and/or a sending device in this disclosure, or may be a chip in the receiving device and/or the sending device. As shown in the figure, the device 1300 includes one or more processors 1310. Optionally, the device may further include a transceiver 1340 coupled to the processor 1310.

Optionally, the first device 1300 further includes a memory 1320 coupled to the processor 1310. The memory 1320 is configured to store instructions performed by the processor. When the instructions are performed by the processor, the processor can implement functions of the units in FIG. 9 to FIG. 12. For specific details, refer to the foregoing descriptions.

The processor 1310 is mainly configured to: process a communication protocol and communication data, control an entire communication apparatus, perform a software program, and process data of the software program. The memory 1320 is mainly configured to store a software program and data. The transceiver 1340 may include a control circuit and an antenna. The control circuit is mainly configured to: perform a conversion between a baseband signal and a radio frequency signal, and process the radio frequency signal. The antenna is mainly configured to receive and send the radio frequency signal in an electromagnetic wave form. The input/output apparatus, for example, a touchscreen, a display screen, or a keyboard, is mainly configured to receive data input by a user and output data to the user.

After the device 1300 is powered on, the processor 1310 may read the software program in the memory 1320, interpret and perform instructions of the software program, and process data of the software program. When data needs to be sent wirelessly, the processor 1310 performs baseband processing on to-be-sent data, and then outputs a baseband signal to a radio frequency circuit. The radio frequency circuit performs a radio frequency processing on the baseband signal, and then sends the radio frequency signal in a form of an electromagnetic wave through an antenna. When data is sent to the device 1300, the radio frequency circuit receives a radio frequency signal through the antenna, converts the radio frequency signal into a baseband signal, and outputs the baseband signal to the processor 1310. The processor 1310 converts the baseband signal into data and processes the data.

The radio frequency circuit and the antenna may be disposed independently of a processor that performs baseband processing. For example, in a distributed scenario, the radio frequency circuit and the antenna may be disposed remotely and independent of a communication apparatus.

The transceiver 1340 may be configured to perform a bidirectional communication. The processor 1340 may have at least one communication interface used for communication. The communication interface may include any interface necessary for communicating with another device.

The processor 1310 may be any type suitable for a native technology network, and may include but is not limited to a general-purpose computer, a dedicated computer, a microcontroller, a digital signal controller (DSP), and one or more controller-based multi-core controller architectures. The device 1300 may have a plurality of processors, such as an application-specific integrated circuit chip, which in time belongs to a clock synchronized with the main processor.

The memory 1320 may include one or more non-volatile memories and/or one or more volatile memories. An example of non-volatile memory includes, but are not limited to, a read-only memory (ROM) 1324, an erasable programmable read-only memory (EPROM), a flash memory, a hard disk, an optical disc (CD), a digital video disk (DVD), and other magnetic storage and/or optical storage. An example of volatile memory includes, but is not limited to, a random access memory (RAM) 1322 and another volatile memory that does not persist during power outage duration.

A computer program 1330 includes computer-executable instructions performed by an associated processor 1310. The program 1330 may be stored in the ROM 1320. The processor 1310 may perform any suitable action and processing by loading the program 1330 into the RAM 1320.

Embodiments of this disclosure may be implemented by the program 1330, so that the device 1300 may perform any process discussed with reference to FIG. 2 to FIG. 6. Embodiments of this present disclosure may also be implemented through hardware or a combination of software and hardware.

In some embodiments, the program 1330 may be tangibly included in a computer-readable medium, and the computer-readable medium may be included in the device 1300 (for example, in the memory 1320) or another storage device that may be accessed by the device 1300. The program 1330 may be loaded from the computer-readable medium to the RAM 1322 for execution. The computer-readable medium may include any type of tangible non-volatile memory, such as a ROM, an EPROM, a flash memory, a hard disk, a CD, or a DVD.

Usually, various embodiments of this disclosure may be implemented by hardware or a dedicated circuit, software, logic, or any combination thereof. Some aspects may be implemented by the hardware, and other aspects may be implemented by firmware or software, and may be performed by a controller, a microprocessor, or another computing device. Although aspects of embodiments of this disclosure are shown and described as block diagrams, flowcharts, or some other figures, it should be understood that the blocks, apparatuses, systems, technologies, or methods described herein may be implemented as, for example, non-limiting examples, hardware, software, firmware, dedicated circuitry or logic, general-purpose hardware or controllers, or other computing devices, or some combination thereof.

This disclosure further provides at least one computer program product tangibly stored on a non-transitory computer-readable storage medium. The computer program product includes computer-executable instructions, such as instructions included in a program module, which are performed in a device on a real or virtual processor of a target to perform the processes/methods described above. Usually, a program module includes a routine, a program, a library, an object, a class, a component, a data structure, or the like that performs a specific task or implements a specific abstract data type. In various embodiments, a function of the program module may be combined or split between the program module as needed. Machine-executable instructions for the program module may be performed locally or within a distributed device. In the distributed device, the program module may be located in a local and remote storage medium.

Computer program code for implementing the method disclosed in this disclosure may be written in one or more programming languages. The computer program code may be provided for a processor of a general-purpose computer, a dedicated computer, or another programmable data processing apparatus, so that when the program code is performed by the computer or the another programmable data processing apparatus, a function/operation specified in the flowchart and/or the block diagram is implemented. The program code can be completely performed on a computer, partially performed on a computer, independently performed as a software package, partially performed on a computer and partially performed on a remote computer, or completely performed on a remote computer or a server.

In a context of this disclosure, the computer program code or related data may be carried in any appropriate carrier, so that the device, the apparatus, or the processor can perform various processing and operations described above. An example of a carrier includes a signal, a computer-readable medium, and the like. An example of a signal may include electricity, light, radio, sound, or other forms of propagation signals, such as a carrier and an infrared signal.

The computer-readable medium may be any tangible medium that includes or stores a program for or has a program about an instruction execution system, an apparatus, or a device. The computer-readable medium may be a computer-readable signal medium or a computer-readable storage medium. The computer-readable medium may include but is not limited to an electronic, a magnetic, an optical, an electromagnetic, an infrared, or a semiconductor system, an apparatus, or a device, or any suitable combination thereof. A more detailed example of the computer-readable storage media includes an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

Further, although operations of the disclosed methods are described in a particular order in the drawings, it is not needed or implied that these operations need to be performed in the particular order, or that all of the operations shown need to be performed to achieve desired results. Instead, the steps described in the flowchart may change the execution order. Additionally, or alternatively, some steps may be omitted, a plurality of steps are combined into one step for performing, and/or one step is decomposed into a plurality of steps for performing. It should also be noted that the features and functions of two or more apparatuses according to this disclosure may be embodied in one apparatus. On the contrary, features and functions of one apparatus described above may be further divided into being embodied by a plurality of apparatuses.

Implementations of this disclosure have been described above, and the foregoing description is an example, not exhaustive, and is not limited to the implementations disclosed. Many modifications and changes are evident to a person of ordinary skill in the art without departing from the scope and spirit of the various implementations illustrated. Terms used in this specification are selected to explain principles, actual applications, or improvements to technologies in the market of each implementation, or to enable another person of ordinary skill in the art to understand each implementation disclosed in this specification.

What is claimed is:

1. A signal modulating method, comprising:
    modulating a bit sequence onto a plurality of subcarriers through binary phase shift keying (BPSK) constellation point mapping, dual carrier modulation (DCM), and a duplication (DUP) operation, wherein
        the plurality of subcarriers include a first group of subcarriers and a second group of subcarriers;
    changing a phase of first data carried in the first group of subcarriers by a first angle, wherein
        the first angle is plus or minus 90 degrees; and
    generating a modulation signal based on the first data carried in the first group of subcarriers and second data carried in the second group of subcarriers.

2. The method according to claim 1, wherein the first group of subcarriers includes an odd-numbered subcarrier in the plurality of subcarriers, and the second group of subcarriers includes an even-numbered subcarrier in the plurality of subcarriers.

3. The method according to claim 1, wherein the first group of subcarriers includes an even-numbered subcarrier in the plurality of subcarriers, and the second group of subcarriers includes an odd-numbered subcarrier of the plurality of subcarriers.

4. A non-transitory computer readable storage medium comprising computer readable instructions that, when executed by a processor, cause the processor to implement the method of claim 1.

5. The method according to claim 1, wherein changing the phase of the first data carried in the first group of subcarriers by the first angle allows an I channel and a Q channel to be simultaneously used when the modulation signal is sent.

6. The method according to claim 1, wherein changing the phase of the first data carried in the first group of subcarriers by the first angle includes multiplying a value carried in the first group of subcarriers by plus or minus i.

7. A signal modulating method, comprising:
    determining, through quadrature phase shift keying (QPSK) constellation point mapping, at least one first frequency domain sequence corresponding to a bit sequence;
    determining, based on a complex number transformation on the at least one first frequency domain sequence, at least one second frequency domain sequence;
    using at least one duplication process, determining, based on the at least one first frequency domain sequence and the at least one second frequency domain sequence, data carried in a plurality of subcarriers; and
    generating a modulation signal based on the data carried in the plurality of subcarriers.

8. The method according to claim 7, wherein the complex number transformation includes at least one of:
    a conjugate transformation;
    swapping between an imaginary part and a real part; or
    a negation operation.

9. The method according to claim 7, wherein
    the at least one duplication process includes a first duplication process, and
    the first duplication process generates a duplicated frequency domain sequence, for determining the data carried in a plurality of subcarriers, by negating a value at an odd-numbered location or an even-numbered location in a to-be-duplicated frequency domain sequence.

10. The method according to claim 7, wherein the at least one duplication process generates a duplicated frequency domain sequence, for determining the data carried in a plurality of subcarriers, by negating a value in a first half or a second half in a to-be-duplicated frequency domain sequence.

11. A device, comprising:
    a processor; and
    a memory configured to store computer readable instructions that, when executed by the processor, cause the device to implement the method of claim 7.

12. A non-transitory computer readable storage medium comprising computer readable instructions that, when executed by a processor, cause the processor to implement the method of claim 7.

13. A device, comprising:
    a processor; and
    a memory configured to store computer readable instructions that, when executed by the processor, cause the device to:
        modulate a bit sequence onto a plurality of subcarriers, wherein the plurality of subcarriers include a first group of subcarriers and a second group of subcarriers;

change a phase of first data carried in the first group of subcarriers by a first angle; and generate a modulation signal based on the first data carried in the first group of subcarriers and second data carried in the second group of subcarriers.

14. The device according to claim 13, wherein the first group of subcarriers includes an odd-numbered subcarrier in the plurality of subcarriers, and the second group of subcarriers includes an even-numbered subcarrier in the plurality of subcarriers.

15. The device according to claim 13, wherein the first group of subcarriers includes an even-numbered subcarrier in the plurality of subcarriers, and the second group of subcarriers includes an odd-numbered subcarrier of the plurality of subcarriers.

16. The device according to claim 13, wherein the first angle is 90 degrees.

17. The device according to claim 13, wherein the bit sequence is modulated onto a plurality of subcarriers through binary phase shift keying (BPSK) constellation point mapping, dual carrier modulation (DCM), and a duplication (DUP) operation.

18. The device according to claim 13, wherein changing the phase of the first data carried in the first group of subcarriers by the first angle allows an I channel and a Q channel to be simultaneously used when the modulation signal is sent.

19. The device according to claim 13, wherein changing the phase of the first data carried in the first group of subcarriers by the first angle includes multiplying a value carried in the first group of subcarriers by plus or minus i.

* * * * *